United States Patent
Laufer et al.

(10) Patent No.: US 9,434,807 B2
(45) Date of Patent: Sep. 6, 2016

(54) CARBODIIMIDE-CONTAINING COMPOSITIONS AND METHOD FOR THE PRODUCTION AND USE THEREOF

(71) Applicant: Rhein Chemie Rheinau GmbH, Mannheim (DE)

(72) Inventors: Wilhelm Laufer, Ellerstadt (DE); Armin Eckert, Oberhausen-Rheinhausen (DE); Martina Hauck, Darmstadt (DE)

(73) Assignee: Rhein Chemie Rheinau GmbH, Mannheim (DE)

( * ) Notice: Subject to any disclaimer, the term of this patent is extended or adjusted under 35 U.S.C. 154(b) by 0 days.

(21) Appl. No.: 14/405,337

(22) PCT Filed: Mar. 22, 2013

(86) PCT No.: PCT/EP2013/056157
§ 371 (c)(1),
(2) Date: Dec. 3, 2014

(87) PCT Pub. No.: WO2013/182329
PCT Pub. Date: Dec. 12, 2013

(65) Prior Publication Data
US 2015/0166714 A1    Jun. 18, 2015

(30) Foreign Application Priority Data

Jun. 5, 2012 (EP) .................... 12170770

(51) Int. Cl.
| | |
|---|---|
| C08G 18/38 | (2006.01) |
| C08G 18/66 | (2006.01) |
| C08G 18/42 | (2006.01) |
| C08G 18/08 | (2006.01) |
| C08G 71/04 | (2006.01) |
| C08K 5/29 | (2006.01) |
| C08L 75/06 | (2006.01) |

(52) U.S. Cl.
CPC ....... *C08G 18/3819* (2013.01); *C08G 18/0838* (2013.01); *C08G 18/42* (2013.01); *C08G 18/4244* (2013.01); *C08G 18/664* (2013.01); *C08G 18/6651* (2013.01); *C08G 71/04* (2013.01); *C08K 5/29* (2013.01)

(58) Field of Classification Search
IPC .................. C08G 18/0838,18/3819, 18/6651, C08G 18/664, 18/42, 18/4244, 71/04; C08K 5/29; C08L 75/06
See application file for complete search history.

(56) References Cited

U.S. PATENT DOCUMENTS

| | | | | |
|---|---|---|---|---|
| 3,193,523 | A | * | 7/1965 | Neumann et al. ............... 560/2 |
| 3,378,517 | A | * | 4/1968 | Awater et al. ............... 524/195 |
| 5,654,479 | A | | 8/1997 | Lehrich et al. |
| 8,507,791 | B2 | | 8/2013 | Suzuta et al. |
| 9,306,196 | B2 | * | 4/2016 | Suzuta .................. B32B 15/08 |

FOREIGN PATENT DOCUMENTS

| | | |
|---|---|---|
| DE | 1130594 B | 5/1962 |
| WO | 2010012695 A1 | 2/2010 |

OTHER PUBLICATIONS

Wagner, K., Findeisen, K., Schäfer, W. and Dietrich, W. (1981), α,ω-Diisocyanato-carbodiimide und-polycarodiimide sowie ihre Derivate. Angew. Chem., 93: 855-866. doi: 10.1002/ange.19810931005.

International Search Report from International Application No. PCT/EP2013/056157, dated Apr. 29, 2013, two pages.

Oertels, Principles of Polyurethane Chemistry and Special Applications, Prepolymer Process, Plastics Handbook 7, 1983, Hanser-Verlag, Munich, DE, p. 25-26.

Rahman, A.K. Fazlur et al., "Catalytic conversion of isocyanates to carbodiimides by cyclopentadienyl manganese tricarbonyl and cyclopentadienyl iron dicarbonyl dimer", Tetrahedron Letters 48 (2007), Elsevier, The Netherlands, pp. 6002-6004.

* cited by examiner

Primary Examiner — Rabon Sergent

(57) ABSTRACT

Carbodiimide containing compositions include diilsocyenates, polyols, and liquid carbodiimide of the formula

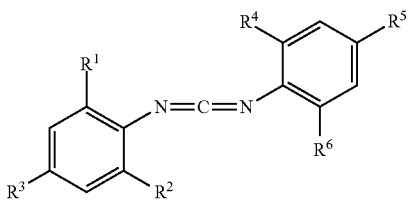

where $R^1$, $R^2$, $R^4$ and $R^6$ are each independently $C_3$-$C_6$-alkyl, and $R^3$ and $R^5$ are each independently $C_1$-$C_3$-alkyl.

14 Claims, No Drawings

CARBODIIMIDE-CONTAINING COMPOSITIONS AND METHOD FOR THE PRODUCTION AND USE THEREOF

The invention relates to novel aromatic carbodiimide- and polyol-containing compositions, to a process for preparation thereof and to the use thereof as a stabilizer and/or compatibilizer in ester-based polyols, in thermoplastic polyurethanes, polyurethane elastomers, PU adhesives, PU casting resins or PU foams.

Polyurethanes form through polyaddition reaction of polyisocyanates with polyhydric alcohols, the polyols, in a virtually quantitative manner. The linkage arises through the reaction of an isocyanate group (—N=C=O) of one molecule with a hydroxyl group (—OH) of another molecule to form a urethane group (—NH—CO—O—).

The course of the reaction between diisocyanate and polyols is dependent on the molar ratio of the components. Intermediates having desirable average molecular weight and desirable end groups may quite possibly be obtained. These intermediates can then be reacted (chain-extended) with a diol or diamine at a later juncture, in which case the desired polyurethane or polyurethane-polyurea hybrid is formed. The intermediates are generally referred to as prepolymer.

Suitable polyols for the production of prepolymers are, as well as the diols, also polyether esters or polyesters having terminal hydroxyl groups (polyester polyols).

For the preparation of mechanically or dynamically highly durable polyurethanes, it is preferable to use polyester polyols.

Carbodiimides have been found to be useful in many applications, for example as hydrolysis stabilizers for thermoplastics, polyols, polyurethanes, etc.

Preference is given to using sterically hindered carbodiimides for this purpose. A carbodiimide that is particularly well known in this connection is 2,6-diisopropylphenylcarbodiimide (Stabaxol® I from Rhein Chemie Rheinau GmbH).

The carbodiimides known in the prior art, however, have the disadvantage of being volatile even at low temperatures. They are thermally unstable, show a significant tendency to blocking in powder form, and have to be melted prior to application, in order only then to be metered in. Further carbodiimides, as described in EP 0 597 382 A1, are likewise solid, are not effective enough at the same dosage, are not preparable in an economically viable manner and/or are commercially unavailable.

There is therefore a need for novel aromatic carbodiimide- and polyol-containing compositions that do not have the aforementioned disadvantages.

It was therefore an object of the present invention to provide novel aromatic carbodiimide- and polyol-containing compositions, wherein the carbodiimides can ideally be applied in liquid form.

This object was surprisingly achieved by the use of particular liquid monomeric carbodiimides in polyol.

The present invention therefore provides a composition comprising
- at least one polyol and
- at least one, preferably room temperature liquid monomeric carbodiimide of the formula (I)

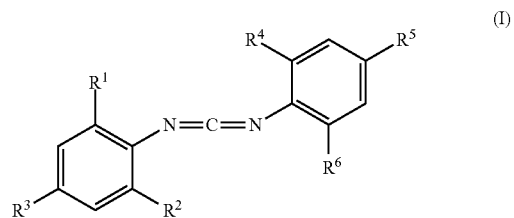

where $R^1$, $R^2$, $R^4$ and $R^6$ is each independently $C_3$-$C_6$-alkyl
and $R^3$ and $R^5$ is each independently $C_1$-$C_3$-alkyl.

The alkyl radicals may be linear and/or branched. They are preferably branched.

The carbodiimides of the formula (I) used in the inventive compositions preferably have $R^1$ to $R^6$ radicals that are the same.

In a further preferred embodiment of the invention, the $R^1$ to $R^6$ radicals are isopropyl.

The scope of the invention includes all general radical definitions, indices, parameters and illustrations mentioned above and below, and those mentioned in preferred ranges with one another, i.e. also any combinations between the respective ranges and preferred ranges.

The compounds of the formula (I) are storage-stable and liquid at room temperature, and feature excellent meterability. They preferably have viscosities at 25° C. of less than 2000 mPas, more preferably of less than 1000 mPas.

These carbodiimides are preparable by the carbodiimidization of trisubstituted benzene isocyanates of the formula (II)

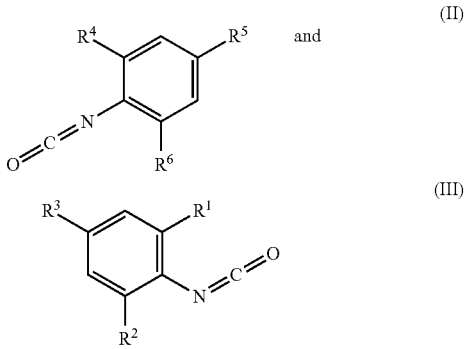

in which $R^1$, $R^2$, $R^4$ and $R^6$ is each independently $C_3$-$C_6$-alkyl
and $R^3$ and $R^5$ is each independently $C_1$-$C_3$-alkyl,
with elimination of carbon dioxide at temperatures of 40° C. to 200° C. in the presence of catalysts and optionally solvents.

The trisubstituted benzene isocyanates are preferably 2,4,6-triisopropylphenyl isocyanate, 2,6-diisopropyl-4-ethylphenyl isocyanate and 2,6-diisopropyl-4-methylphenyl isocyanate. The trisubstituted benzene amines needed for the preparation thereof can—as is known to those skilled in the art—be prepared by a Friedel-Crafts alkylation of aniline with the appropriate alkene, haloalkane, haloalkenebenzine and/or halocycloalkane.

Subsequently, they are reacted with phosgene to give the corresponding trisubstituted benzene isocyanate.

The carbodiimidization is preferably effected by the methods described in Angew. Chem. 93, p. 855-866 (1981) or DE-A-11 30 594 or Tetrahedron Letters 48 (2007), p. 6002-6004.

Preferred catalysts for the preparation of the compounds of the formula (I), in one embodiment of the invention, are strong bases or phosphorus compounds. Preference is given to using phospholene oxides, phospholidines or phospholine oxides, and the corresponding sulfides. It is also possible to use, as catalysts, tertiary amines, basic metal compounds, alkali metal or alkaline earth metal oxides or hydroxides, alkoxides or phenoxides, metal carboxylates and non-basic organometallic compounds.

The carbodiimidization can be performed either in substance or in a solvent. It is likewise possible first to commence the carbodiimidization in substance and subsequently to complete it after addition of a solvent. Solvents used may, for example, be benzines, benzene and/or alkylbenzenes.

Solvents used may, for example, be benzines, benzene and/or alkylbenzenes.

Preferably, the carbodiimides for use in the process according to the invention are purified before they are used. The crude products can be purified either by distillation or by means of extraction. Suitable solvents used for the purification may be alcohols, ketones, ethers or esters.

It is also likewise possible to prepare the carbodiimides for use in the process according to the invention from the trisubstituted anilines by reaction with $CS_2$ to give the thiourea derivative and subsequent reaction in basic hypochlorite solutions to give the carbodiimide, or by the methods described in EP 0597382 A.

The polyols in the context of the invention are long-chain compounds that preferably have a molecular weight in (g/mol) of up to 2000, preferably between 1000-2000 and more preferably between 500-1000.

The term "polyol" in the context of the invention encompasses both long-chain diols and triols, and also compounds having more than three hydroxyl groups per molecule. The use of triols is particularly preferred.

Preferred polyols are polyester polyols and/or polyether ester polyols present in the liquid form at temperatures of 30-80° C.

It is advantageous when the polyol has an OH number of up to 200, preferably between 20 and 150 and more preferably between 50 and 115. Especially suitable are polyester polyols which are reaction products of various polyols with aromatic or aliphatic dicarboxylic acids and/or polymers of lactones.

Preference is given here to aromatic dicarboxylic acids, which can be used for formation of suitable polyester polyols. Particular preference is given here to terephthalic acid, isophthalic acid, phthalic acid, phthalic anhydride, and substituted dicarboxylic acid compounds having a benzene ring.

Preferred aliphatic dicarboxylic acids are those which can be used for the formation of suitable polyester polyols, more preferably sebacic acid, adipic acid and glutaric acid.

Preferred polymers of lactones are those which can be used for the formation of suitable polyester polyols, more preferably polycaprolactone.

Both the dicarboxylic acids and the polymers of lactones are commodity chemicals.

Particular preference is also given to those polyols that can be used for formation of suitable polyester polyols, most preferably ethylene glycol, butanediol, neopentyl glycol, hexanediol, propylene glycol, dipropylene glycol, diethylene glycol and cyclohexanedimethanol.

In a further preferred embodiment of the invention, the polyols are polyether ester polyols.

For this purpose, preference is given to the reaction products of various aforementioned polyols with aromatic or aliphatic dicarboxylic acids and/or polymers of lactones (e.g. polycaprolactone).

The polyols used in the context of the invention are typically commodity chemicals available from Bayer MaterialScience AG under the Baycoll® or Desmophen® trade name.

In a further embodiment of the invention, the composition additionally comprises at least one diisocyanate.

Preferred diisocyanates are aromatic and aliphatic diisocyanates. Particular preference is given to toluene 2,4-diisocyanate, toluene 2,6-diisocyanate, phenylene diisocyanate, 4,4-diphenylmethane diisocyanate, methylenebis(4-phenyl isocyanate), naphthalene 1,5-diisocyanate, tetramethylene 1,4-diisocyanate and/or hexamethylene 1,6-diisocyanate, very particular preference to toluene 2,4-diisocyanate and toluene 2,6-diisocyanate.

In a further embodiment of the invention, the composition additionally comprises at least one diamine and/or diol.

Preferred diamines used as chain extenders are 2-methylpropyl 3,5-diamino-4-chlorobenzoate, bis(4,4'-amino-3-chlorophenyl)methane, 3,5-dimethylthio-2,4-tolylenediamine, 3,5-dimethylthio-2,6-tolylenediamine, 3,5-diethyl-2,4-tolylenediamine, 3,5-diethyl-2,6-tolylenediamine, 4,4'-methylenebis(3-chloro-2,6-diethylaniline) and 1,3-propanediol bis(4-aminobenzoate).

The diamines or diols used in the context of the invention for chain extension are commodity chemicals available from Rheinchemie Rheinau GmbH under the Addolink® trade name.

Preferred diols for the chain extension are short-chain diols having a molar mass of less than 200 g/mol, preferably butane-1,4-diol or else hexane-1,6-diol and/or hydroquinone bis(2-hydroxyethyl) ether (HQEE).

The diols used in the context of the invention are commodity chemicals available, inter alia, from Rhein Chemie Rheinau GmbH under the Addolink® trade name.

The ratio of carbodiimide to polyol is preferably 0.1-5, more preferably 1-3, parts by weight per 100 parts by weight of polyol.

The ratio of diisocyanate to polyol is preferably 20 to 50:100 parts by weight, more preferably 25 to 35:100 parts by weight.

In the cases in which the composition comprises, as well as the polyol and the carbodiimide and the diisocyanate, additionally at least one diamine and/or diol, the amount of diamine and/or diol is 5-30% by weight, based on the composition.

In the cases in which the composition comprises, as well as the polyol and the carbodiimide and the diisocyanate, additionally at least one catalyst, the amount of catalyst is 0.01-1% by weight, based on the composition.

Catalysts used are preferably dibutyltin dilaurates or triethylenediamine in dipropylene glycol.

The catalysts used in the context of the inventions are commodity chemicals available from Rheinchemie Rheinau GmbH under the Addocat® trade name.

The present invention additionally provides for the preparation of the inventive composition, in which the polyol is initially charged and the liquid carbodiimide of formula (I) or a mixture of carbodiimides of formula (I) is stirred in.

In the cases in which the inventive mixture additionally comprises the diisocyanate, this is stirred into the composition composed of polyol and at least one carbodiimide of formula (I) at temperatures between 80 and 130° C. The polymer formed as the polyaddition reaction proceeds likewise forms part of the subject matter of the invention.

The present invention additionally provides the polymer obtainable from the reaction of at least one polyol and at least one carbodiimide of formula (I) with a diisocyanate at temperatures between 80 and 130° C.

The ratio of diisocyanate to polyol is preferably 20 to 50:100 parts by weight, more preferably 25 to 35:100 parts by weight.

Preferred diisocyanates are the aforementioned aromatic and aliphatic diisocyanates. Particular preference is given to toluene 2,4-diisocyanate, toluene 2,6-diisocyanate, phenylene diisocyanate, 4,4-diphenylmethane diisocyanate, methylenebis(4-phenyl isocyanate), naphthalene 1,5-diisocyanate, tetramethylene 1,4-diisocyanate and/or hexamethylene 1,6-diisocyanate, very particular preference to toluene 2,4-diisocyanate and toluene 2,6-diisocyanate.

In the cases in which the inventive mixture, as well as the diisocyanate, additionally comprises an amine and/or diol, this is stirred into the composition composed of polyol and at least one carbodiimide of formula (1) and diisocyanate at temperatures between 40 and 100° C.

In the cases in which the inventive mixture, as well as the diisocyanate and the amine and/or diol, additionally comprises at least one catalyst, this is first premixed with the diol and stirred into the composition composed of polyol and at least one carbodiimide of formula (I) and diisocyanate at temperatures between 40 and 100° C.

Alternatively, the preparation of the inventive compositions can also be prepared by the "one-shot" process. This process, described, for example, in G. Oertels, Kunststoff Handbuch 7 [Plastics Handbook 7], on page 26, can be employed analogously with the inventive carbodiimides.

The present invention additionally provides for the use of the inventive compositions in thermoplastic polyurethanes (TPU), polyurethane elastomers, PU adhesives, PU casting resins or PU foams as protection against hydrolytic degradation.

The examples which follow serve to illustrate the invention but have no limiting effect.

Working Examples

A polymeric carbodiimide based on tetramethylxylylene diisocyanate obtainable under the Stabaxol® P 200 name and a solid monomeric carbodiimide (bis(2,6-diisopropylphenyl)carbodiimide), available under the Stabaxol® I name from Rhein Chemie Rheinau GmbH, was tested in comparison with the carbodiimide (CDI I) of the formula

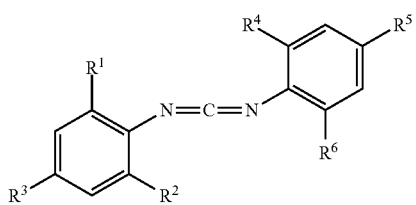

where the $R^1$ to $R^6$ radicals are isopropyl, in polyester polyol of the Desmophen® 2001 KS type from Bayer MaterialScience AG.

Preparation of the Carbodiimide used in the Inventive Composition

A baked-out and nitrogen-filled 500 ml flange vessel was initially charged under a nitrogen stream with 400 g of 2,4,6-triisopropylphenyl isocyanate and heated to 140° C. After adding 400 mg of 1-methylphospholene oxide, the reaction mixture was heated to 160° C. within 5 hours. Thereafter, reaction was continued at 160° C. until an NCO content of <1% (corresponding to >95% conversion) had been attained. The crude product thus obtained was purified by means of distillation. The product obtained was a pale yellow liquid having a viscosity of 700 mPas at 25° C.

Thermal Stability

To study the thermal stability, thermogravimetry analyses were conducted with a TGA analysis unit from Mettler Toledo (TGA/SDTA851). For this purpose, 10-15 mg in each case of sample were analyzed under nitrogen with a temperature ramp from 30 to 600° C. and at a heating rate of 10° C./min. The temperature in ° C. on attainment of a weight loss of 5% was assessed [T(5%)].

The results are shown in Table 1:

| Carbodiimide | T(5%) of carbodiimide [° C.] |
|---|---|
| Stabaxol ® I (C) | 200 |
| Stabaxol ® P 200 (C) | 270 |
| CDI I (inv.) | 260 |

C = comparative example, inv. = Inventive

Acid Number Decrease in Polyester Polyol

As is known, the effect of a hydrolysis stabilizer based on sterically hindered carbodiimides in liquid polyester polyols can be tested by means of the decrease in acid number.

The decrease in acid number in the inventive composition was tested using CDI I compared to the abovementioned Stabaxol I and Stabaxol P 200 in the polyester polyol Desmophen® 2001 KS from Bayer MaterialScience AG.

For this purpose, at 80° C., 1% by weight of the abovementioned carbodiimides was stirred into polyester polyol having a measured acid number of about 0.9 mg KOH/g and the acid number was measured regularly.

The results are shown in Table 2:

| Carbodiimide in Desmophen 2001 KS | Acid number [mg KOH/g] after 0 min | Acid number [mg KOH/g] after 30 min | Acid number [mg KOH/g] after 60 min | Acid number [mg KOH/g] after 120 min | Acid number [mg KOH/g] after 120 min | Acid number [mg KOH/g] after 480 min |
|---|---|---|---|---|---|---|
| CDI I (inv.) | 0.86 | 0.51 | 0.27 | 0.09 | 0.00 | |
| Stabaxol ® I (C) | 0.92 | 0.67 | 0.45 | 0.26 | 0.12 | 0.04 |
| Stabaxol ® P 200 (C) | 0.87 | 0.69 | 0.55 | 0.42 | 0.35 | 0.28 |

C = comparative example, inv. = inventive

The results show that the acid is surprisingly degraded much more quickly in the inventive polyester polyol/carbodiimide composition that in the compositions containing Stabaxol® I or Stabaxol® P 200. At the same time, the carbodiimide in the inventive composition has excellent thermal stability, which has been known to date only in the case of the less reactive polymeric carbodiimides.

What is claimed is:

1. A composition comprising:
a polyether ester polyol that is liquid at temperatures of 30° C.-80° C., and/or a polyester polyol that is liquid at temperatures of 30° C.-80° C.;
a carbodiimide of the formula (I) that is liquid at room temperature

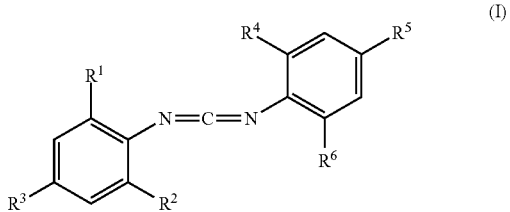

where $R^1$, $R^2$, $R^4$ and $R^6$ are each independently $C_3$-$C_6$-alkyl, and
$R^3$ and $R^6$ are each independently $C_1$-$C_3$-alkyl, and
a diisocyanate,
where a ratio of diisocyanate to polyol is 20-50:100 parts by weight.

2. The composition as claimed in claim 1, wherein the $R^1$ to $R^6$ radicals are the same within the molecule.

3. The composition as claimed in claim 2, wherein the $R^1$ to $R^6$ radicals are isopropyl.

4. The composition as claimed in claim 1, further comprising a mixture of a plurality of carbodiimides of the formula (I).

5. The composition as claimed in claim 1, additionally comprising a catalyst.

6. The composition as claimed in claim 5, additionally comprising a diamine and/or a further short-chain diol having a molar mass less than 200 g/mol.

7. The composition of claim 1, wherein the ratio of diisocyanate to polyol is 25 to 35:100 parts by weight.

8. The composition of claim 1, wherein the polyols have a molecular weight of 1000 to 2000 g/mol, and an OH number of 20 to 150.

9. The composition of claim 8, wherein:
the ratio of diisocyanate to polyol is 25:100 to 35:100 parts by weight;
the ratio of carbodiimide to polyol is 0.1:100 to 5:100 parts by weight; and
the composition additionally comprises, based on the weight of the composition:
0.01 to 1 wt % of a catalyst; and
5 to 30 wt % of a diamine and/or a further short-chain did having a molar mass less than 200 g/mol.

10. A process for preparing the composition as claimed in claim 1, the process comprising charging a vessel with the polyol and stirring or metering the liquid carbodiimide of formula (I) or a mixture of liquid carbodiimides of formula (I) into the polyol.

11. The process for preparing a composition as claimed in claim 10, further comprising stirring the diisocyanate into the composition composed of polyol and carbodiimide of formula (I) at temperatures between 80 and 130° C.

12. A process for preparing a composition as claimed in claim 6, the process comprising premixing the catalyst with the diamine and/or the further short-chain diol having a molar mass less than 200 g/mol to produce a premix, and stirring the premix into a composition composed of the polyol, the carbodiimide of formula (I) and the diisocyanate at temperatures between 40° C. and 100° C.

13. A polymer obtained by reaction of:
a polyether ester polyol that is liquid at temperatures of 30° C.-80° C., and/or a polyester polyol that is liquid at temperatures of 30° C.-80° C., and
a carbodiimide of the formula (I) that is liquid at room temperature

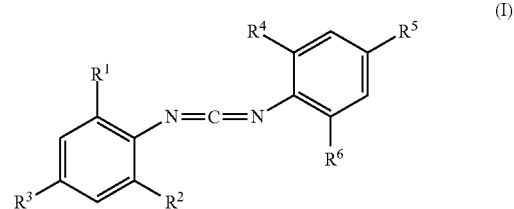

where $R^1$, $R^2$, $R^4$ and $R^6$ is each independently $C_3$-$C_6$-alkyl, and
$R^3$ and $R^5$ is each independently $C_1$-$C_3$-alkyl,
with a diisocyanate at temperatures between 80° C. and 130° C., where a ratio of diisocyanate to polyol is 20-50:100 parts by weight.

14. The polymer of claim 13, wherein the ratio of diisocyanate to polyol is 25 to 35:100 parts by weight.

* * * * *